(12) United States Patent
Kim

(10) Patent No.: US 10,285,529 B2
(45) Date of Patent: May 14, 2019

(54) JUICER PROVIDED WITH OPENING/CLOSING MECHANISM FOR REMNANTS

(71) Applicant: Jae-Won Kim, Gimhae-si (KR)

(72) Inventor: Jae-Won Kim, Gimhae-si (KR)

( * ) Notice: Subject to any disclaimer, the term of this patent is extended or adjusted under 35 U.S.C. 154(b) by 585 days.

(21) Appl. No.: 14/894,340

(22) PCT Filed: Aug. 26, 2013

(86) PCT No.: PCT/KR2013/007609
§ 371 (c)(1),
(2) Date: Nov. 26, 2015

(87) PCT Pub. No.: WO2014/193035
PCT Pub. Date: Dec. 4, 2014

(65) Prior Publication Data
US 2016/0113429 A1 Apr. 28, 2016

(30) Foreign Application Priority Data

May 27, 2013 (KR) .......................... 10-2013-0059476

(51) Int. Cl.
*A47J 19/02* (2006.01)
*A47J 19/06* (2006.01)

(52) U.S. Cl.
CPC ............... *A47J 19/06* (2013.01); *A47J 19/02* (2013.01)

(58) Field of Classification Search
CPC ...... A47J 43/046; A47J 19/027; A47J 19/025; A47J 43/042; A47J 19/02; A47J 19/06
USPC .................................. 99/501, 502, 503, 513
See application file for complete search history.

(56) References Cited

U.S. PATENT DOCUMENTS

2009/0049998 A1 * 2/2009 Kim .................. A47J 19/06
99/510
2012/0291638 A1 * 11/2012 Kim .................. A47J 19/027
99/501

FOREIGN PATENT DOCUMENTS

| EP | 2510842 | * 10/2012 |
|---|---|---|
| KR | 10-1994-0019251 | 9/1994 |
| KR | 20-1996-0009523 | 10/1996 |
| KR | 20-0190676 | 8/2000 |
| KR | 10-2006-0101848 | 9/2006 |
| KR | 10-1159176 | 6/2012 |
| KR | 10-1167274 | 7/2012 |
| KR | 1020120138189 | * 12/2012 |
| KR | 10-2013-0028535 | 3/2013 |

(Continued)

*Primary Examiner* — Dana Ross
*Assistant Examiner* — Joseph W Iskra

(57) ABSTRACT

The present invention relates to a juicer including a draff control unit. The juicer includes: a mainbody; a housing including a draff outlet port formed at a lower portion thereof, and a draff descending hole formed on a bottom surface thereof; a cover; a feed screw; and a draff control unit including an opening and closing plate consisting of a rear portion and a front portion, the rear portion being elastically not deformable and the front portion being elastically deformable, the opening and closing plate being configured such that it completely opens the draff outlet port, and such that in the case where the opening and closing plate closes at least partially the draff outlet port, the draff outlet port is selectively closed by either the front portion or the rear portion, or by a part of the front portion and a part of the rear portion.

8 Claims, 5 Drawing Sheets

(56) References Cited

FOREIGN PATENT DOCUMENTS

WO    WO 2014/193035    12/2014

\* cited by examiner

JUICER PROVIDED WITH OPENING/CLOSING MECHANISM FOR REMNANTS

RELATED APPLICATIONS

This application is a National Phase of PCT Patent Application No. PCT/KR2013/007609 having International filing date of Aug. 26, 2013, which claims the benefit of priority of Korean Patent Application No. 10-2013-0059476 filed on May 27, 2013. The contents of the above applications are all incorporated by reference as if fully set forth herein in their entirety.

FIELD AND BACKGROUND OF THE INVENTION

The present invention relates to a juicer. More particularly, the present invention relates to a juicer which can carry out the assembling, disassembling, and washing of the juicer in a simple and convenient manner while performing an excellent juice-extracting function irrespective of the kinds and states of materials such as vegetables, fruits or soybeans put into the juicer in the production of green vegetable juice, fruit juice or soybean milk.

An existing juicer is an appliance that presses and crushes a raw material put into an inlet port or a feed tube at high speed and produce juice from the crushed material using a centrifugal separation method. However, the existing juicer has drawbacks in that intrinsic flavor and nutrients contained in the material may be destroyed during the high-speed crushing process, and it is difficult to extract green vegetable juice from vegetables having stems or leaves. It is also difficult to extract fruit juice from fruits having a high viscosity such as kiwis or strawberries, and it is impossible to extract soybean milk from soybeans. In addition, for the purpose of continuous production of juice, it is required to frequently disassemble and clean the juicer to remove draff or residue caught in mesh holes of a mesh drum.

In addition, it is indispensable that a food processing apparatus should be maintained in a clean state, and a juicer washing and cleaning process should be carried out smoothly. If food adheres to the inner wall of the apparatus or if the apparatus becomes dirty, the food will be easily rotten and bacteria will proliferate. Thus, it is necessary that the internal components of the apparatus should be disassembled and cleaned easily.

Korean Utility Model Registration No. 190676 discloses a juice extractor having a grinding function, in which the conventional juice extractor is provided with a long feed screw horizontally assembled with a drum together with a juice-extracting net and a drum cap and engaged with a sidewall of a drive unit. Thus, the overall length of the juice extractor is long, and the extractor performs the juice extracting operation when a raw material put into the mesh drum through an inlet port are horizontally transferred at low speed.

Thus, the juice extractor disclosed in Korean Utility Model Registration No. 190676 has drawbacks in that a large space is required in using or keeping the juice extractor in custody, and in that since juice is extracted from a raw material along with the horizontal movement thereof, the juice extraction speed becomes low, and thick juice having a high viscosity does not flow downwardly smoothly, but may be collected in the drum. Also, there is a problem in that since the feed screw has no rotary shaft at one end thereof, the end of the feed screw may be shaken when being rotated, and thus collide with wall blades formed on an inner wall of the juice-extracting net to cause noise and abrasion of the feed screw to occur.

Further, the juice extractor is necessarily required to be disassembled and washed after its use in order to solve a hygienic problem which may occur by food remained inside the juice extractor and prevent damage of components of the juice extractor. Therefore, the juice extractor requires a configuration that minimizes inconvenience during disassembly and assembly. Further, there is a need for improvement of the prevention of safety accident, and the securing of durability during the use of the juice extractor.

In an attempt to solve such problems, Korean Patent Registration No. 1159176 discloses a technology related to a juicer including a draff control unit. According to the cited document, the juicer can make soybean milk from soybeans using the principle of a millstone which grinds, presses and squeezes the beans, and make fruit juice from fruits having a high viscosity such as tomatoes, kiwis, or strawberries by rubbing, pressing and crushing the fruits over a grater. In addition, since a housing of the juicer is vertically coupled to an upper side of a mainbody, the material is naturally moved downwardly due to gravity as a feed screw is rotated. Thus, since the juice extraction speed is high and the juice collection phenomenon does not occur, juice can be promptly extracted effectively from various kinds of vegetables or fruits.

In addition, according to the juicer disclosed in Korean Patent Registration No. 1159176, a mesh drum discharge hole is formed at the underside of the mesh drum so that draff is discharged therethrough separately from juice, and a draff packing is provided at the bottom end of the mesh drum discharge hole, so that draff having reached the bottom ring of the mesh drum by the rotation of a feed screw is pushed by a screw discharge step formed at a lower end of the screw and is guided to the mesh drum discharge hole along a discharge inclined surface of the screw to cause the draff to be extruded while pressing the draff packing that closes the mesh drum discharge hole so as to be discharged to the outside of the juicer through a draff outlet port.

In addition, the juicer includes a draff control unit configured to control an opening and closing degree of the mesh drum discharge hole so that an opening degree of the discharge hole can be controlled depending on the nature of the material used.

Further, the draff packing is provided at the mesh drum discharge hole and the draff control unit controls the degree of supporting the draff packing below the draff packing so that a primary prevention of the draff discharge is achieved by the draff packing and a secondary prevention of the draff discharge is achieved by the draff control unit, thereby enabling a more precise control.

However, the juicer disclosed in Korean Patent Registration No. 1159176 has a limitation in that since the draff packing is formed as a single structure having a constant elasticity and size, it does not achieve the optimum juice extraction rate with respect to various materials having different physical properties despite an advantage that extraction of juice and separation of draff are easily performed even in the case where the juicer includes only the draff packing.

More specifically, when a fragile and soft raw material is used, the draff packing formed of a relatively ductile material is used whereas when a strong and tough raw material is used, the draff packing formed of a relatively rigid material is used, so that an appropriate compression force can be applied to a raw material put into the inlet port. But since a single draff packing is provided in the juicer, the optimum extraction juice efficiency cannot be achieved.

In addition, since such a draff packing is securely fixed to the underside of the mesh drum, an inconvenience is caused to a user when washing and cleaning the mesh drum discharge hole.

Moreover, in the case where the juicer is not provided with the draff packing in the mesh drum discharge hole, but is provided with only the draff control unit, it is difficult for a user to apply a proper compression force for constantly preventing the draff discharge to a raw material put into the inlet port, and it is not easy to control the opening and closing degree of the mesh drum discharge hole. In addition, the user suffers from an inconvenience of having to control the opening and closing degree of the mesh drum discharge hole while always watching the mesh drum discharge hole carefully.

Further, even in the case where the draff packing is provide in the mesh drum discharge hole and the draff control unit controls the degree of supporting the draff packing below the draff packing, since the draff packing is not removed from the underside of the mesh drum during the disassembling and cleaning of the juice after being used, it is difficult to cleanly wash the mesh drum discharge hole. Also, even in the case where green vegetable juice or fruit juice is separately extracted from various kinds of vegetables or fruits, the user suffers from an inconvenience of having to first extract juice from one kind of vegetable or fruit and completely disassemble and wash the juicer to remove draff or residue inside thereof, and then again assemble the juicer to extract juice from the next raw material.

SUMMARY OF THE INVENTION

Accordingly, an object of the present invention is to provide a juicer, in which an optimum compression force can be applied to a raw material put into the juicer depending on the nature of the material when juice is extracted from the material, the divided strength of a packing can be controlled even without including various types of packing elements in the juicer, and the washing of the juicer can be easily performed.

Technical Solution

To accomplish the above object, there is provided a juicer including a draff control unit, the juicer including:
a mainbody having a drive shaft configured to rotate;
a housing opened at a top thereof and mounted at an upper portion of the mainbody, the housing including a juice outlet port and a draff outlet port formed at a lower portion thereof in such a manner as to be spaced apart from each other, and a draff descending hole formed on a bottom surface thereof so as to fluidically communicate with the draff outlet port;
a cover configured to cover the top of the housing;
a mesh drum mounted in the housing, opened at the top and bottom thereof, and having at least one mesh holes formed on a side wall thereof;
a feed screw rotatably coupled to an upper portion of the mainbody in such a manner that the drive shaft of the mainbody is inserted into a lower end of the feed screw, and disposed in the mesh drum, the feed screw having screw blades protrudingly formed on the outer circumferential surface thereof; and
a draff control unit including an opening and closing plate consisting of a rear portion and a front portion, the rear portion being elastically not deformable by a force applied downwardly by draff discharged to the draff outlet port through the draff descending hole and the front portion being elastically deformable by the force applied downwardly by draff, the opening and closing plate being configured such that it completely opens the draff outlet port, and such that in the case where the opening and closing plate closes at least partially the draff outlet port, the draff outlet port is selectively closed by either the front portion or the rear portion, or by a part of the front portion and a part of the rear portion.

More preferably, in the juicer of the present invention, the opening and closing plate is provided at a lower end of the draff descending hole so as to either completely open the lower end of the draff descending hole, or partially or wholly close the lower end of the draff descending hole.

In addition, in the juicer of the present invention, the draff outlet port includes an adjustment hole formed at one side thereof in proximity to the draff descending hole, and the opening and closing plate operates in cooperation with a rotary control lever rotatably coupled to a bottom of the housing so that the rotary control lever controls a degree to which the opening and closing plate is inserted into the adjustment hole. The rear portion of the opening and closing plate is formed such that the surface of a rigid core material is at least partially covered with an outer soft material having elasticity, and the front portion is formed of the soft material having elasticity.

Moreover, in the juicer of the present invention, the outer soft material of the rear portion of the opening and closing plate is the same as that of the front portion, and the outer soft material of rear portion is integrally formed with the front portion.

In the juicer of the present invention, the rigid core material at least partially covered with the outer soft material has one or more holes formed therein, and the outer soft material of the rear portion and the soft material of the front portion are integrally formed with each with while passing through the holes.

In addition, in the juicer of the present invention, an end of the rotary control lever is protruded outwardly from a side wall of the housing.

Further, the juicer of the present invention further includes a juice control unit mounted at the juice outlet port and configured to open or close the juice outlet port to permit or block the discharge of juice.

Besides, the juicer of the present invention further includes a brush mounted between the housing and the mesh drum and configured to sweep the inner surface of the housing and the outer surface of the mesh drum.

Meanwhile, in the juicer of the present invention, the mesh drum is hermetically sealed at a sidewall thereof.

The juicer including a draff control unit in accordance with an embodiment of the present invention as constructed above have the following advantages.

First, the present invention enables a degree of opening and closing of the draff outlet port or a degree of elasticity of the opening and closing plate to be finely controlled using the draff control unit that opens or closes the draff outlet port, so that a degree in which draff can escape from the draff outlet port is controlled to prevent draff from being escaping from the draff outlet port in a state in which juice is not extracted sufficiently. Thus, a proper compression force for extracting juice is provided to a raw material put into the inlet port depending on the kind and state of the material so that an improved juice extraction rate can be expected.

Second, the present invention enables the draff outlet port to be completely opened so that even in the case where green vegetable juice or fruit juice is separately extracted from various kinds of vegetables or fruits, the juicer can be simply washed even without disassembling and assembling the juicer each time when juice is extracted from vegetables or fruits. In other words, the juicer is operated in a state in which the draff outlet port is completely opened simply so that most draff or residue remained in the juicer can be easily discharged to the outside through the opened draff outlet port by rotating the feed screw. Thus, the inside of the juicer can be simply washed even without disassembling the juicer. In addition, it is possible to eliminate an inconvenience of having to disassembling, washing and re-assembling the juicer to extract juice from another material so that a pure juice extraction operation can be achieved in which different raw materials are not mixed together each time when a raw material from which juice is to be extracted is changed. Resultantly, juice is separately extracted from various kinds of raw materials in an easy and convenient manner.

Third, the outer surface of the draff control unit is formed of a material having a high frictional force and an excellent air-tightness so that a degree of opening and closing of the draff outlet port can be easily controlled even without a separate retaining member.

Fourth, the opening and closing plate consists of an elastically deformable front portion and a non-deformable rear portion, which are integrally formed with each other so that the draff control unit can be easily removed from the housing, foreign substances do not adhere to the inner wall of the juicer, and the cleaning of the juicer is easily performed.

Fifth, the sidewall of the mesh drum which is easily replaced is formed in a hermetically sealed shape or in a meshed shape so that juice is isolated from draff by the sidewall of the mesh drum. In addition, in the case where material such as garlic needs to be grinded, the juicer can also be used as a grinder so that the applicable range of the juicer can be extended.

BRIEF DESCRIPTION OF THE DRAWINGS

The above objects, other features and advantages of the present invention will become more apparent by describing the preferred embodiments thereof with reference to the accompanying drawings, in which.

Figure 1:
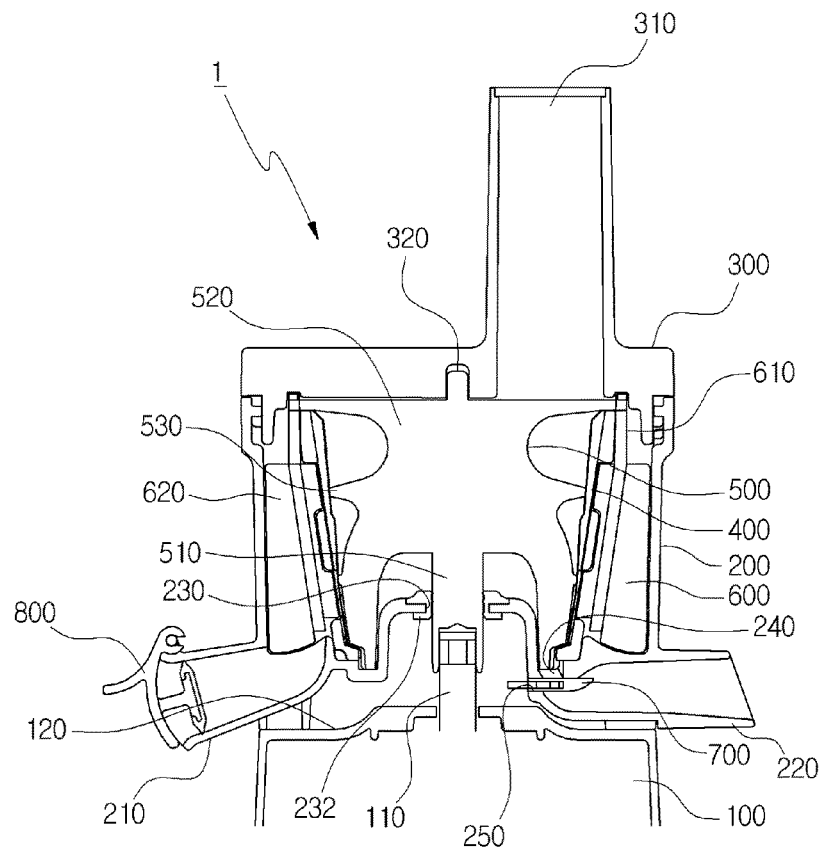
FIG. 1 is a cross-sectional view showing a juicer including a draff control unit in accordance with one embodiment of the present invention.

*Explanation on Reference Numerals of Main Elements in the Drawings*

| | |
|---|---|
| 10, 100, 100a, 100b: mesh drum | 111: mesh plate |
| 1: juicer including a draff control unit | 100: mainbody |
| 200: housing | 210: juice outlet port |
| 220: draff outlet port | 230: hollow through-part |
| 240: draff descending hole | 250: adjustment hole |
| 300: cover | 400: mesh drum |
| 500: feed screw | 510: rotary shaft |
| 520: screw body | 530: screw blades |
| 600: brush | 610: brush holder |
| 620: brush blades | 700: draff control unit |
| 710: opening and closing plate | 720: rear portion |
| 730: front portion | 740: core material |
| 742: hole | 750: outer soft material |
| 760: rotary control lever | 800: juice control unit |

Preferred Embodiments of the Invention

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In the drawings, for the sake of a clearer understanding of the present invention, sizes or shapes of elements illustrated in the drawings may be exaggerated for clarity and convenience. Also, the following terms particularly defined in consideration of the configuration and function of the present invention may vary according to an intention of a user or an operator or according to custom. Therefore, definition of such terms should be made based on overall contents of the specification.

As shown in FIG. 1, the juicer 1 according to the present invention basically includes a mainbody 100, a housing 200, a cover 300, a mesh drum 400, and a feed screw 500. In addition, the juicer 1 according to the present invention may include a brush 600. Further, the inventive juicer 1 includes a draff control unit 700 that opens or closes a draff descending hole 240 formed in the housing 200.

Basically, the juicer 1 according to the present invention can be used to put raw materials containing moisture such as fruits or vegetables and discharge the put material divided into juice and draff, which will be described later.

Hereinafter, in order to facilitate the understanding of the juicer 1 according to the present invention, respective elements constituting the juicer will be described in detail.

The cover 300 is closely coupled to an upper end of the housing of the inventive juicer 1, and includes an inlet port 310 formed therein so as to put raw materials such as vegetables or fruits thereto and forms a top portion of the inventive juicer 1. The cover 300 is configured such that a predetermined amount of raw material can be continuously put into the juicer, and thus the cover 300 is constructed in a shape in which it is opened at a top of one side thereof as shown in FIG. 1, but not a shape in which it is completely isolated from the outside.

The housing 200 coupled to the lower end of the cover 300 has a bowl shape and functions to collect juice and discharge the juice to the outside of the juicer.

The housing 20 is provided with both a juice outlet port 210 and a draff outlet port 220 on the outer surface of a lower portion thereof, so that the juice outlet port 210 discharges juice collected in the housing 200 and the draff outlet port 220 discharges draff from which the juice has been strained out of the raw material put into the cover 300.

Herein, the housing 200 includes a draff descending hole 240 formed on a bottom surface thereof so as to fluidically communicate with the draff outlet port 220. A draff control unit 700 is provided in a path along which the draff is discharged through the draff descending hole 240. In the case where a mesh drum discharge hole (not shown) is formed at a lower end of the mesh drum so that the mesh drum discharge hole is inserted into the draff descending hole 240, the draff control unit 700 may be configured to open or close the mesh drum discharge hole. In addition, the draff control unit 700 may be configured to open or close the draff descending hole 240 formed in the housing 200 or the draff outlet port 220. The draff control unit 700 will be described in detail later.

Juice flowing downwardly along the side surface of the mesh drum 50 is discharged through the juice outlet port 210 and the residue descending from the lower end of the mesh drum 400 is discharged through the residue outlet 22, so that the juice outlet port 210 and the draff outlet port 220 are separately formed.

As described above, the mesh drum 400 functions to divide the juice discharged through the juice outlet port 210 from the draff discharged through the draff outlet port 220. To this end, in the housing 200, the space defining the outside the mesh drum 400 fluidically communicates with the juice outlet port 210 and the space defining the inside of the mesh drum 400 fluidically communicates with the draff outlet port 220. In other words, during the process of crushing and squeezing fruits, vegetables or the like put into the mesh drum 400, both the feed screw 500 and the mesh drum 400 are operated, so that juice is discharged from the mesh drum 400 to the juice outlet port 210 and draff is not discharged from the mesh drum 400 but remains in the mesh drum 400. The residue is then pushed downwardly by the feed screw 500 and is discharged from the mesh drum 400 to the outside sequentially through the draff descending hole 240 and the draff outlet port 220. In this case, the mesh drum discharge hole (not shown) may be formed at the lower end of the mesh drum 400. In addition, when the mesh drum 400 is mounted in the housing 200, the mesh drum discharge hole may be inserted into the draff descending hole of the housing so that the draff can be discharged to outside through the draff outlet port via the mesh drum discharge hole.

A through-hole 230 is formed at the center of the bottom of the housing 200. The lower end of a rotary shaft 510 is inserted downwards through the through hole 230 and is connected to a drive shaft 110. The through-hole 230 is formed at a region protruding upwards from the central area of the bottom of the housing 200, so that juice can be prevented from flowing into the mainbody 100 through the through-hole 230. Further, a through-hole packing 232 made of rubber or silicone is formed in the through-hole 230, thereby more efficiently preventing the juice from flowing into the mainbody 100.

The draff descending hole 240 fluidically communicating with the draff outlet port 220 is formed in the bottom of the housing 200 corresponding to the lower end of the feed screw 500. The draff outlet port 220 is connected to the draff descending hole 240 so that draff from which juice has been strained is discharged to the outside through the draff outlet port 220 via the draff descending hole 240. In other words, the draff outlet port 220 has the shape of a channel which starts from the draff descending hole 240 and fluidically communicates with the outside of the housing.

A seating part 120 is formed on the top of the mainbody 100, and the drive shaft 110 is provided at a central portion of the seating part 120. The mainbody 100 is a part that generates power in the juicer 1 and has a motor (not shown) and a reduction gear (not shown) therein.

The lower end of the housing 200 is placed tightly on the seating part 120.

The drive shaft 110 is formed at the central portion of the seating part 120, and is connected to the motor and the reduction gear in the mainbody 100. The drive shaft 110 is rotated at low speed by the motor and the reduction gear to cause the feed screw 500 to be rotated.

The feed screw 500 is provided with the rotary shaft 510 with a screw body 520 and screw blades 530 provided around the rotary shaft 510.

The upper end of the feed screw 500 is supported by the cover 300, while the lower end thereof is connected to the drive shaft 110. A rotary shaft hole 320 is formed at a central portion of a rear surface of the cover 300 so that the upper end of the feed screw 500 can be inserted into the shaft hole so as to be supported thereby.

The lower end of the rotary shaft 510 is connected to the drive shaft 110, and the feed screw 500 can be rotated by the rotation of the drive shaft 110. Preferably, the rotary shaft 510 is rotated integrally with the drive shaft 110 without slipping after being coupled to the drive shaft 110. The drive shaft 110 has the shape of a prism. A recess may be formed in the lower end of the rotary shaft 510 such that the drive shaft 110 can be precisely inserted into the rotary shaft 510.

The screw blades 530 are helically formed around the screw body 520. The entire screw body 520 is formed thick so as to press and squeeze input food using the junction between the screw blades 42.

The screw body 520 is formed in a shape which its diameter is small at an upper portion thereof and gradually increases as it goes toward the lower portion from the upper portion. Therefore, the upper portion of the screw body 520 is slightly spaced apart from the mesh drum 400, while the lower portion thereof is close to the mesh drum 400.

The interaction between the screw body 520 and the screw blades 530 squeezes fruits put into the juicer while naturally feeding the fruits downwardly.

When the feed screw 500 rotates, a ring gear (not shown) may rotate the brush 600. In addition, the feed screw 500 may be engaged with the brush 600 at the upper end or the lower end thereof to rotate the brush 600.

The mesh drum 400 is configured to surround the feed screw 500, and may be configured in various manners such as a shape which is hermetically sealed at a sidewall thereof and/or is formed with a plurality of mesh holes on the sidewall thereof.

In the case where the mesh drum 400 has a plurality of mesh holes formed on the sidewall thereof, juice can be isolated from draff by the sidewall of the mesh drum 400. In addition, in the case where the sidewall of the mesh drum 400 is hermetically sealed at the sidewall thereof, the juicer can be used as a grinder when material such as garlic needs to be grinded so that the applicable range of the juicer 1 can be extended. In other words, the latter case is a case in which juice is not isolated from draff, and can be applied when compression, squeezing or crushing of the material is needed.

In the state in which the feed screw 500 is coupled to the mesh drum 400, the remaining draff from which juice has been strained is not discharged through the sidewall of the mesh drum 400, but is moved downwards and is discharged to the outside through the draff outlet port 220.

The brush 600 may be installed between the housing 200 and the mesh drum 400. The brush 600 includes a brush holder 610 and a brush blade 620 coupled to a side of the brush holder 610.

The brush holder 610 is spaced apart both from the housing 200 and from the mesh drum 400 without being in close contact with the housing and the mesh drum. When the feed screw 500 rotates, the brush holder 610 rotates together with the feed screw 500. The brush blade 620 is fixedly mounted to the brush holder 610 so that an outer end thereof is in close contact with the inner surface of the housing 200 and an inner end thereof is in close contact with the outer surface of the mesh drum 400. Therefore, when the brush 600 is rotated, the brush blade 620 sweeps both the inner surface of the housing 200 and the outer surface of the mesh drum 400, so that the juice can smoothly flow downwardly.

The brush 600 serves as a washing means exhibiting an excellent washing effect if the juicer needs to be washed. That is, juice or draff may be caught in or adhere to the mesh drum 400 and the housing 200. In this case, when the brush 600 is rotated with washing water, the draff may be easily removed from the mesh drum 400 and the housing 200. Thus, the brush 600 serves as a washing brush. As described above, the juicer 1 according to the present invention is configured such that juice and draff are isolated from each other so as to be discharged.

Figure 2A:
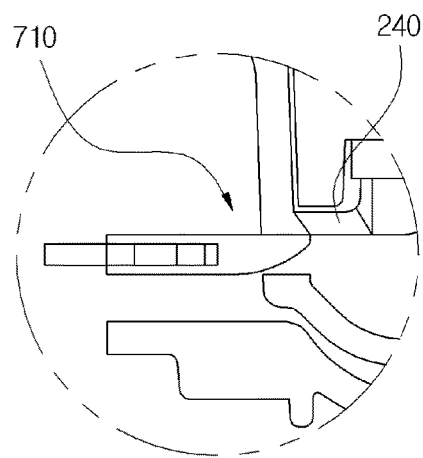
FIGS. 2a, 2b and 2c are enlarged cross-sectional views showing a draff descending hole portion illustrating the use state of a draff control unit of the juicer shown in FIG. 1.
Figure 2B:
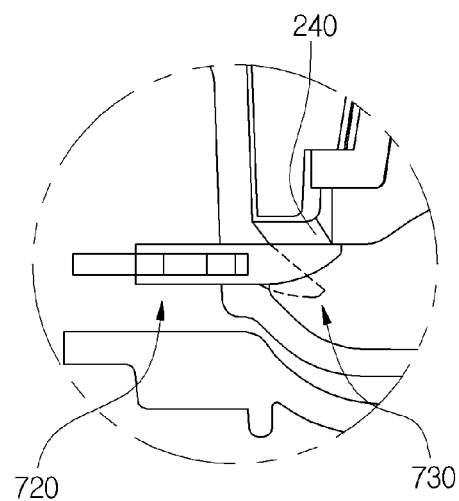
Figure 2C:
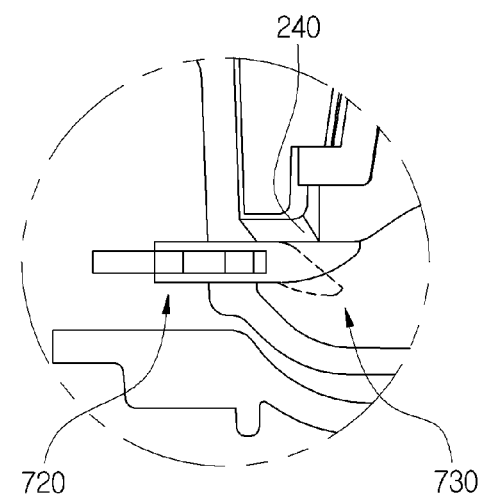

FIG. 2a shows a state in which the draff descending hole 240 is completely opened, FIG. 2b shows a state in which the draff descending hole 240 is closed but may be easily opened even when a discharge pressure is low due to a decreased elasticity of the opening and closing plate 710, and FIG. 2c shows a state in which the draff descending hole 240 may be opened when the discharge pressure is higher than that in the case of FIG. 2b due to a slightly increased elasticity of the opening and closing plate 710.

The draff control unit 700 functions to open or close the path along which the draff is moved. More specifically, although it has been illustrated and described that the draff control unit 70 is a means for opening or closing the draff descending hole 240, it may be configured to open or close the mesh drum discharge hole in a state in which the draff control unit 70 is in close contact with the lower end of the mesh drum discharge hole in the case where the mesh drum discharge hole is formed in the mesh drum within a scope for achieving this object. Alternatively, the draff control unit 70 may be configured to open or close the draff outlet port 220 without being in close contact with the lower end of the mesh drum discharge hole. Thus, the draff control unit 70 may be configured in various manners so that a person of ordinary skill in the art can easily understand it.

Figure 3:
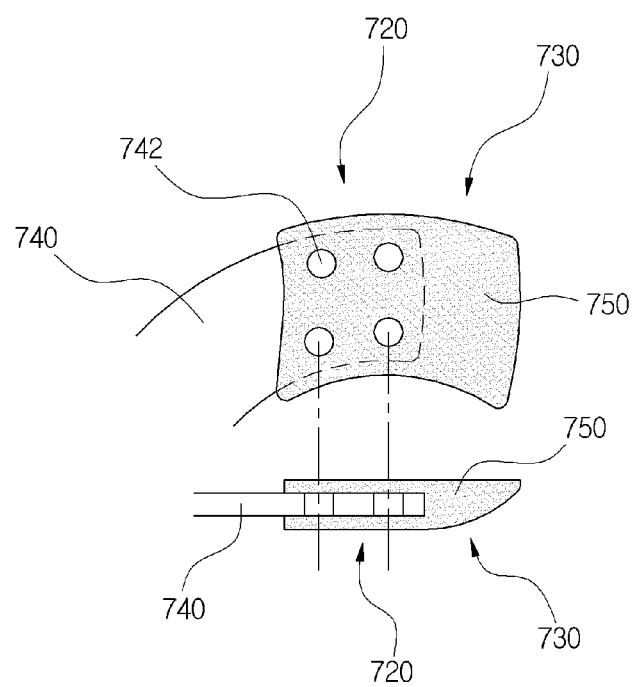
FIG. 3 is a top plan and side view showing a draff control unit of the juicer in accordance with one embodiment of the present invention.

As shown in FIG. 3, the draff control unit 700 includes an opening and closing plate 710 consisting of a rear portion 720 and a front portion 730. The rear portion is elastically not deformable by a force applied downwardly by draff discharged to the draff outlet port 220 through the draff descending hole 240 formed at the bottom of the housing 200, and the front portion is elastically deformable by the force applied downwardly by draff.

The rear portion 720 of the opening and closing plate 710 is formed such that the surface of a rigid core material 740 is at least partially covered with an outer soft material 750 having elasticity, and the front end 730 thereof is formed of a soft material 750 having elasticity. As shown in FIG. 3, preferably, the outer soft material 750 of the rear portion 720 of the opening and closing plate 710 is the same as that of the front portion 730 thereof, and the outer soft material 750 of the rear portion is integrally formed with the front portion.

To this end, the rigid core material 740 has one or more holes 742 formed therein, and the outer soft material 750 of the rear portion 720 and the soft material 750 of the front portion 730 are integrally formed with each with while passing through the holes 742.

The rear portion 720 of the opening and closing plate 710 is connected to a position control means that changes a relative position of the opening and closing plate 710 to the draff descending hole 240 so as to control the position of the opening and closing plate 710.

Any means may be used as the position control means in the present invention as long as it can change the relative position of the opening and closing plate 710 to the draff descending hole 240. For example, a guide groove may be formed at both sides of the draff descending hole 240 and a guide projection may be formed on the opening and closing plate 710 so as to be slidably inserted into the guide groove so that the opening and closing plate 710 can perform a translational motion along a linear path while covering the draff descending hole 240.

Figure 4A:
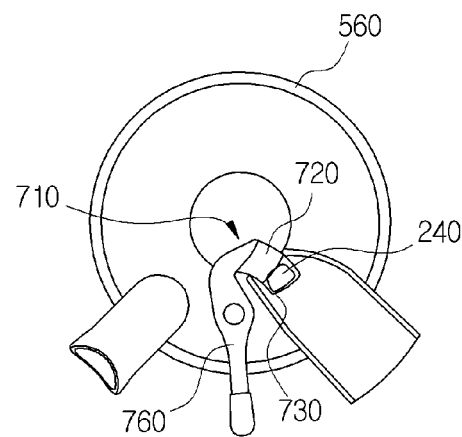
FIGS. 4a and 4b are views showing the use state of a draff control unit of the juicer in accordance with one embodiment of the present invention.
Figure 4B:
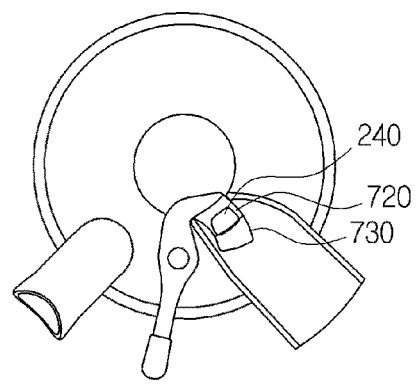

Alternatively, as shown in FIGS. 4a and 4b illustrating a bottom view of a housing in a state in which the draff outlet port 220 is cut off horizontally in order to facilitate the understanding of the invention, the rear portion 720 of the opening and closing plate 710 rotatably mounted to the bottom of the housing 500 may be coupled to an end of a rotary control lever 760 or may be formed integrally with the end of the rotary control lever 760 to form the core material 740 of the rear portion 720 of the opening and closing plate 710 so that the opening and closing plate 710 can rotate in cooperation with the rotary control lever 760. The draff outlet port 220 of the housing 200 includes an adjustment hole 250 formed at one side thereof in proximity to the draff descending hole 240. The opening and closing plate 710 operates in cooperation with a rotary control lever 760 so that the rotary control lever controls a degree to which the opening and closing plate 710 is inserted through the adjustment hole 250. The size of the adjustment hole 250 is sufficient as long as it the opening and closing plate 710 can be slidably inserted into the adjustment hole 250. In addition, the adjustment hole 250 may be formed equal to or smaller than the sectional area of the opening and closing plate 710 so that the opening and closing plate 710 can be hermetically inserted into the adjustment hole 250. FIG. 4a shows a state in which the elastically deformable front portion 730 of the opening and closing plate 710 closes the draff descending hole 240 completely, and FIG. 4b shows a state in which the non-deformable rear portion 720 of the opening and closing plate 710 closes the draff descending hole 240 completely.

Figure 5A:
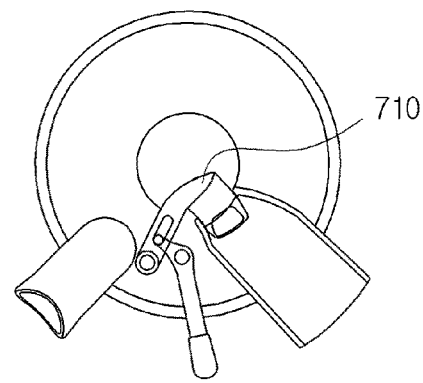
FIGS. 5a and 5b are views showing the use state of a draff control unit of a juicer in accordance with another embodiment of the present invention.
Figure 5B:
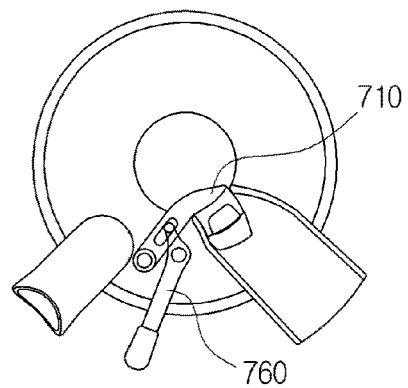
Figure 6A:
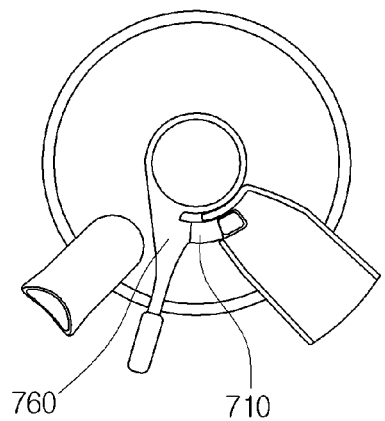
FIGS. 6a and 6b are views showing the use state of a draff control unit of a juicer in accordance with still another embodiment of the present invention.
Figure 6B:
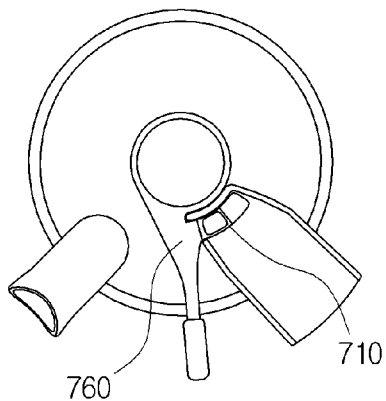

In FIGS. 4a and 4b, there is shown the case where a rotary shaft is mounted at an intermediate portion of the rotary control lever 760 and the opening and closing plate 710 is directly connected to an end of the rotary control lever 760. In FIGS. 5a and 5b, where is shown the case where at least one linkage member is disposed between the rotary control lever 760 and the opening and closing plate 710. Also, in FIGS. 6a and 6b, there is shown the case where the rotary shaft of the rotary control lever 760 is coaxially disposed with the a central axis of the hollow through-part 230, and the opening and closing plate 710 extends to the intermediate portion of the rotary control lever 760 so that the opening and closing plate 710 is inserted into a side of the draff outlet port to control a degree of opening and closing of the draff outlet port. But, the present invention is not limited thereto, but as long as it is possible to control a degree to which the opening and closing plate 710 is inserted into the adjustment hole 250 while operating in cooperation with the rotary control lever 760 irrespective of the position of the rotary shaft and although at least one linkage member is disposed between the rotary control lever 760 and the opening and closing plate 710, this falls within the scope of the present invention.

Besides the case shown in FIGS. 4a and 4b, other cases may be contemplated in which the position of the opening and closing plate 710 is controlled by the rotary control lever 760 or the like so that the draff descending hole 240 is closed or opened.

For example, FIG. 2a shows a state in which the draff descending hole 240 is completely opened, in which case, there is no force or pressure required for discharge of draff. FIG. 2b shows a state in which the draff descending hole 240 is closed by only the elastically deformable front portion 730, in which case, there is a pressure required for discharge of draff but the pressure is low. FIG. 2c shows a state in which the draff descending hole 240 is closed by a part of the non-deformable rear portion 720 and a part of the elastically deformable front portion 730, in which case, there is a high pressure required for discharge of draff. In this case, as a degree in which the draff descending hole 240 is closed by the rear portion 720 is larger, a pressure required for discharge of draff becomes higher.

In addition, although not shown in the drawings, the case may be contemplated in which the draff descending hole 240 is partially closed by the elastically deformable front portion 730 and is partially opened in the present invention. Thus, it is possible to contemplate various opening and closing states of the draff descending hole.

In other words, in the present invention, the draff descending hole 240 can be wholly closed by the opening and closing plate 710. In this case, the draff descending hole 240 may be closed by (i) only the front portion 730, (ii) only the rear portion 720, or by (iii) a part of the front portion 730 and a part of the rear portion 720. In the case where the draff descending hole 240 is closed by a part of the front portion 730 and a part of the rear portion 720, the ratio between the front portion 730 and the rear portion 720 can be controlled.

Next, the draff descending hole 240 may be partially closed by the opening and closing plate 710, in which case, the closed portion of the draff descending hole 240 varies depending on the size of the opening and closing plate 710. However, in principle, the draff descending hole 240 may be partially closed by either (i) only the front portion 730, or (ii) a part of the front portion 730 and a part of the rear portion 720. In the case where the draff descending hole 240 is closed by a part of the front portion 730 and a part of the rear portion 720, the closed portion of the draff descending hole 240 varies depending on the size of the opening and closing plate 710. However, in principle, the ratio between the front portion 730 and the rear portion 720 can be controlled.

In other words, based on a synthesis of the two cases, in the case where the draff descending hole 240 is at least partially closed by the opening and closing plate 710, it is selectively closed by only the front portion 730, only the rear portion 720, or a part of the front portion 730 and a part of the rear portion 720.

As constructed above, for example, when a fragile and soft raw material is used, the draff from which juice has been strained is lightly supported by the front portion 730 of the opening and closing plate 710 whereas when a strong and tough material is used, the draff from which juice has been strained is supported by the rear portion 720 formed of a relatively rigid material so that the opening and closing plate 710 can sufficiently prevent the discharge of the draff. Thus, an appropriate compression force for extracting juice can be applied to a raw material put into the inlet port.

It is possible to completely close the draff descending hole 240 using the opening and closing plate 710. In this case, the draff is not discharged from the housing 200 but juice extraction is possible. In addition, the extraction of drinkable juice from a raw material can be performed efficiently without a necessity of discharging draff depending on the properties of raw materials such as fruits which have been peeled off. In addition, the juice outlet port 210 and the draff outlet port 220 are closed together with a juice control unit 800 provided in the juice outlet port 210 so that the inventive juicer can be used to make smoothie. Further, the juicer is useful to mix blended beverages, and can also be used to add peanuts, almonds, walnuts, cereals or the like together to juice or milk therein and grind and mix them.

Last, it is of course to be noted that the draff descending hole 240 is not closed but is completely opened by the opening and closing plate 710.

By virtue of this configuration, since the draff descending hole 240 can be completely opened so that most of the remaining draff can be discharged, juice can be individually extracted simply from various kinds of vegetables or fruits without an inconvenience of having to disassemble, clean and re-assemble the juicer each time when a raw material from which juice is to be extracted is replaced by another.

In addition, as shown in FIG. 1, the juicer according to in the present invention may further includes the juice control unit 800 mounted at the juice outlet port 210 so as to open or close the juice outlet port to permit or block the discharge of juice. The juice control unit 800 is sufficient as long as it is configured so as to selectively open or close the juice outlet port 210. The juice control unit 800 itself has a known configuration, and thus a detailed description thereof will be omitted to avoid redundancy. Moreover, if the juice control unit 800 is provided in the juice outlet port 210, the interior of the juicer can be effectively washed without disassembling the juicer after extraction of juice has been terminated in combination of the characteristics that the draff descending hole 240 can be completely opened.

In other words, the juice control unit 800 of the juice outlet port 210 is closed, and the draff descending hole 240 is closed by manipulating the rotary control lever 760. Thereafter, when water is fully filled in the housing 200 through the inlet port and the juicer is operated, the feed screw 500 is brought into close contact with the inner wall of the mesh drum 400 while rotating and the brush 600 sweeps the inner surface of the housing 200 and the outer surface of the mesh drum 400. Thus, likewise, when the juice outlet port 210 and the draff descending hole 240 are opened by manipulating the juice control unit 800 and the rotary control lever 760 after the juicer is operated for a certain time period, draff remaining in the juicer can be cleanly discharged to the outside through the juice outlet port 210 and the draff outlet port 220 together with water.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

As described above, the draff control unit according to the present invention enables the draff outlet port to be completely opened so that the washing of the juicer and the discharge of the remaining draff can be easily achieved. Thus, juice can be effectively extracted subsequently from various kinds of raw materials without mixing of the residues by eliminating an inconvenience of having to disassemble the juicer to remove draff or residue in the mesh drum, and then re-assemble the juicer.

In addition, since the draff control unit according to the present invention enables the draff descending hole to be closed in various states even in the case where the draff descending hole is closed, i.e., a degree of closing of the draff descending hole can be controlled, the inventive juicer has an advantage in that it is possible to attain the optimum juice extraction performance in the optimum closing state conforming to the properties of the raw materials or the demand of a user.

What is claimed is:

1. A juicer, the juicer comprising:
  a mainbody having a drive shaft configured to rotate;
  a housing opened at a top thereof and mounted at an upper portion of the mainbody, the housing including a juice outlet port and a draff outlet port formed at a lower portion thereof in such a manner as to be spaced apart from each other, and a draff descending hole formed on a bottom surface thereof so as to fluidically communicate with the draff outlet port;
  a cover configured to cover the top of the housing;
  a mesh drum mounted in the housing, opened at the top and bottom thereof, and having at least one mesh holes formed on a side wall thereof;
  a feed screw rotatably coupled to an upper portion of the mainbody in such a manner that the drive shaft of the mainbody is inserted into a lower end of the feed screw, the feed screw being disposed in the mesh drum and having screw blades protrudingly formed on the outer circumferential surface thereof; and
  a draff control unit including an opening and closing plate consisting of a rear portion and a front portion, the rear portion being elastically not deformable by a force applied downwardly by draff discharged to the draff outlet port through the draff descending hole and the front portion being elastically deformable by the force applied downwardly by draff to finely control a degree of opening and closing of the draff outlet port or a degree of elasticity of the opening and closing plate,
  wherein the draff outlet port comprises an adjustment hole formed at one side thereof in proximity to the draff descending hole, and
  wherein the opening and closing plate operates in cooperation with a rotary control lever rotatably coupled to a bottom of the housing so that the rotary control lever controls a degree to which the opening and closing plate is inserted into the adjustment hole, and
  wherein the rear portion of the opening and closing plate is formed such that the surface of a rigid core material is at least partially covered with an outer soft material having elasticity, and the front end thereof is formed of the soft material having elasticity, and
  wherein the opening and closing plate being configured to be movable by the cooperation with the rotary control lever such that the opening and closing plate completely opens the draff outlet port and such that in the case where the opening and closing plate closes at least partially the draff outlet port, the draff outlet port is closed by only the front portion, only the rear portion, or a part of the front portion and a part of the rear portion.

2. The juicer according to claim 1, wherein the opening and closing plate is provided at a lower end of the draff descending hole so as to either completely open the lower end of the draff descending hole, or partially or wholly close the lower end of the draff descending hole.

3. The juicer according to claim 1, wherein the outer soft material of the rear portion of the opening and closing plate is the same as that of the front portion thereof, and the outer soft material of the rear portion is integrally formed with the front portion.

4. The juicer according to claim 1, wherein the rigid core material has one or more holes formed therein, and the outer soft material of the rear portion and the soft material of the front portion are integrally formed with each with while passing through the holes.

5. The juicer according to claim 1, wherein an end of the rotary control lever is protruded outwardly from a side wall of the housing.

6. The juicer according to claim 1, further comprising a juice control unit mounted at the juice outlet port and configured to open or close the juice outlet port to permit or block the discharge of juice.

7. The juicer according to claim 1, further comprising a brush mounted between the housing and the mesh drum and configured to sweep the inner surface of the housing and the outer surface of the mesh drum.

8. The juicer according to claim 1, wherein the mesh is hermetically sealed at a sidewall thereof.

* * * * *